C. WEBER.
APPARATUS FOR PLASTERING WALL SURFACES.
APPLICATION FILED AUG. 7, 1915.
1,298,426.
Patented Mar. 25, 1919.
10 SHEETS—SHEET 7.
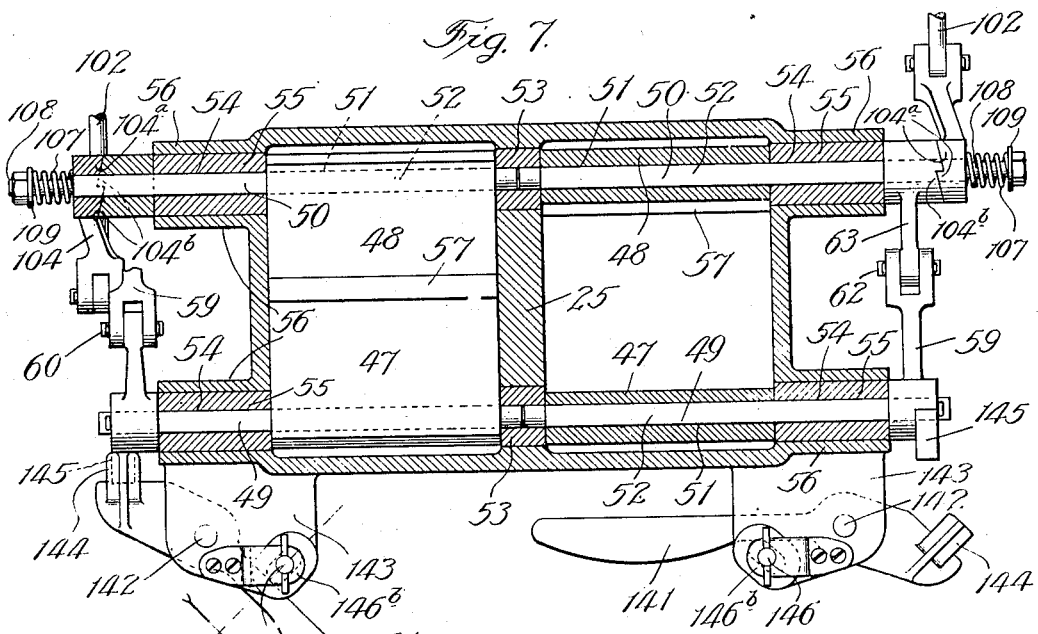
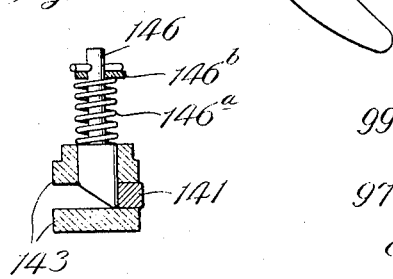
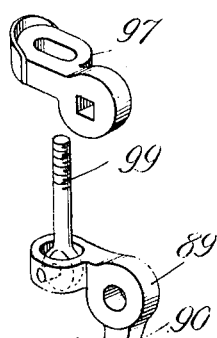
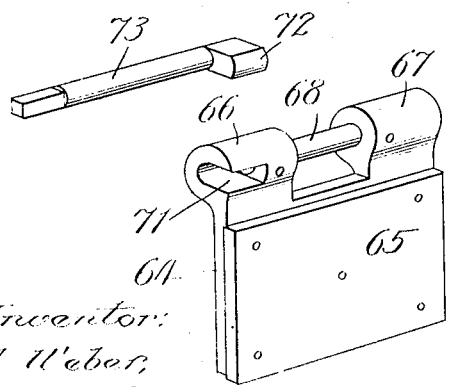
Witnesses:
Inventor:
Carl Weber,
By Dyrenforth, Lee, Chritton and Wiles
Attys.

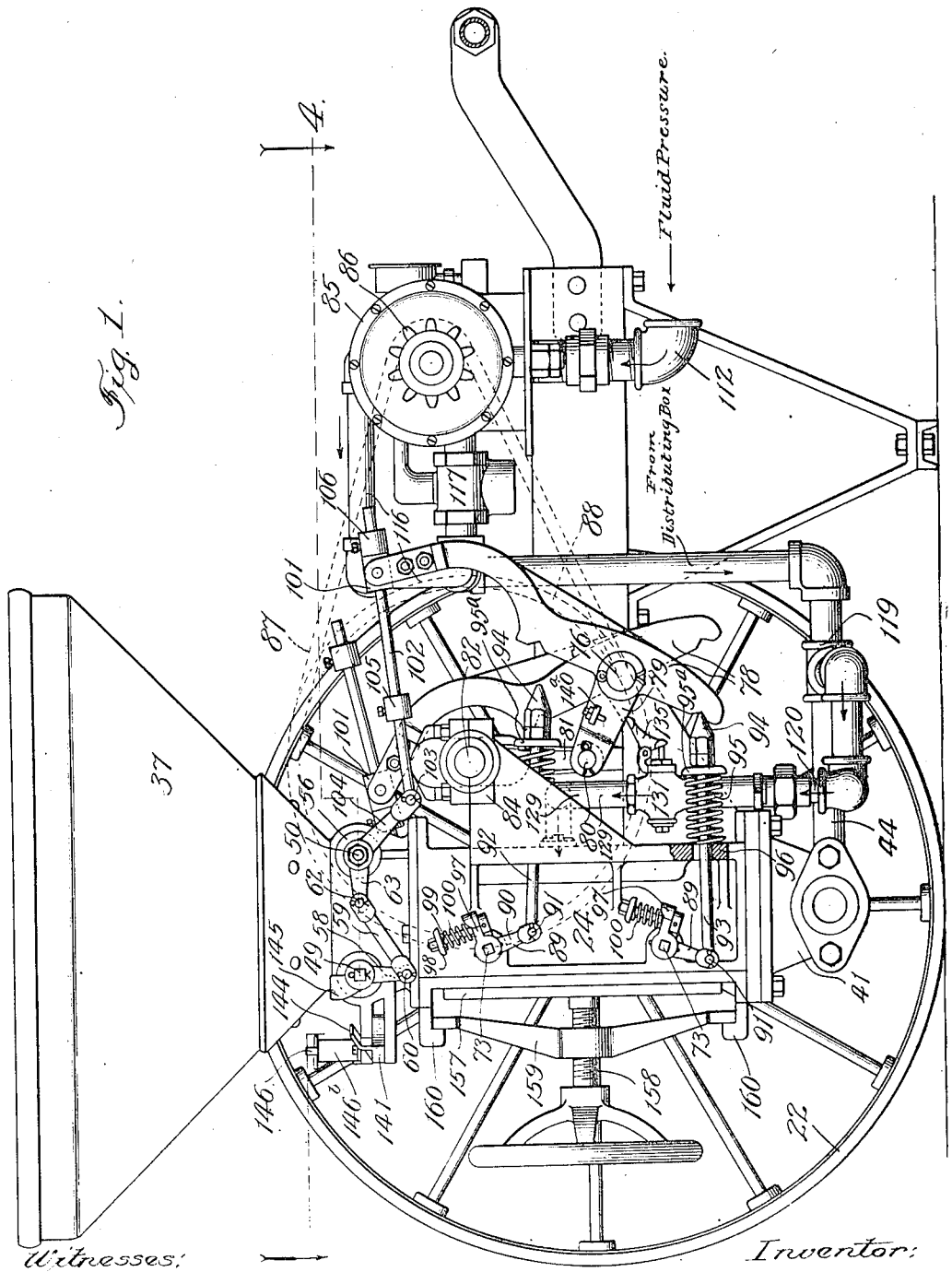

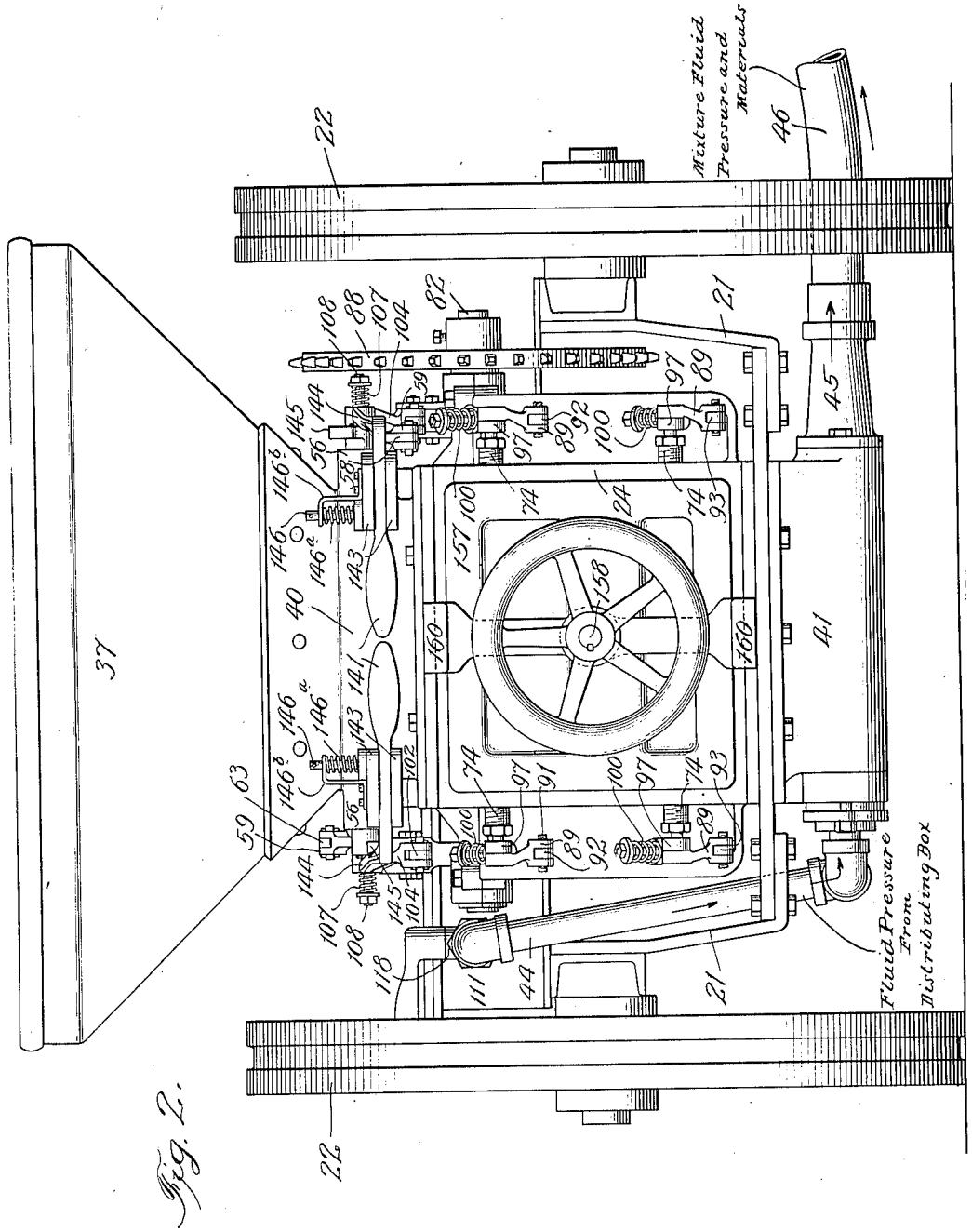

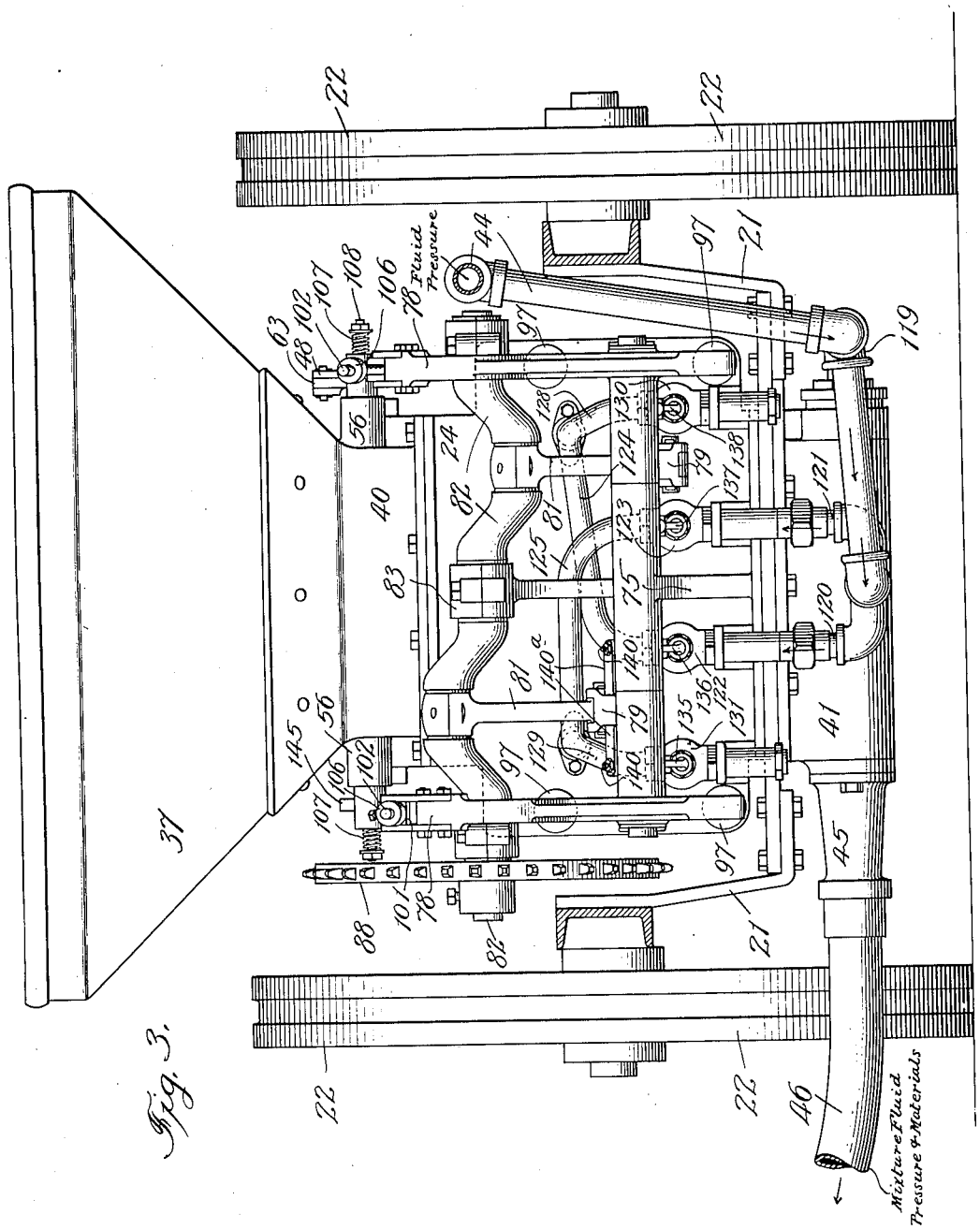

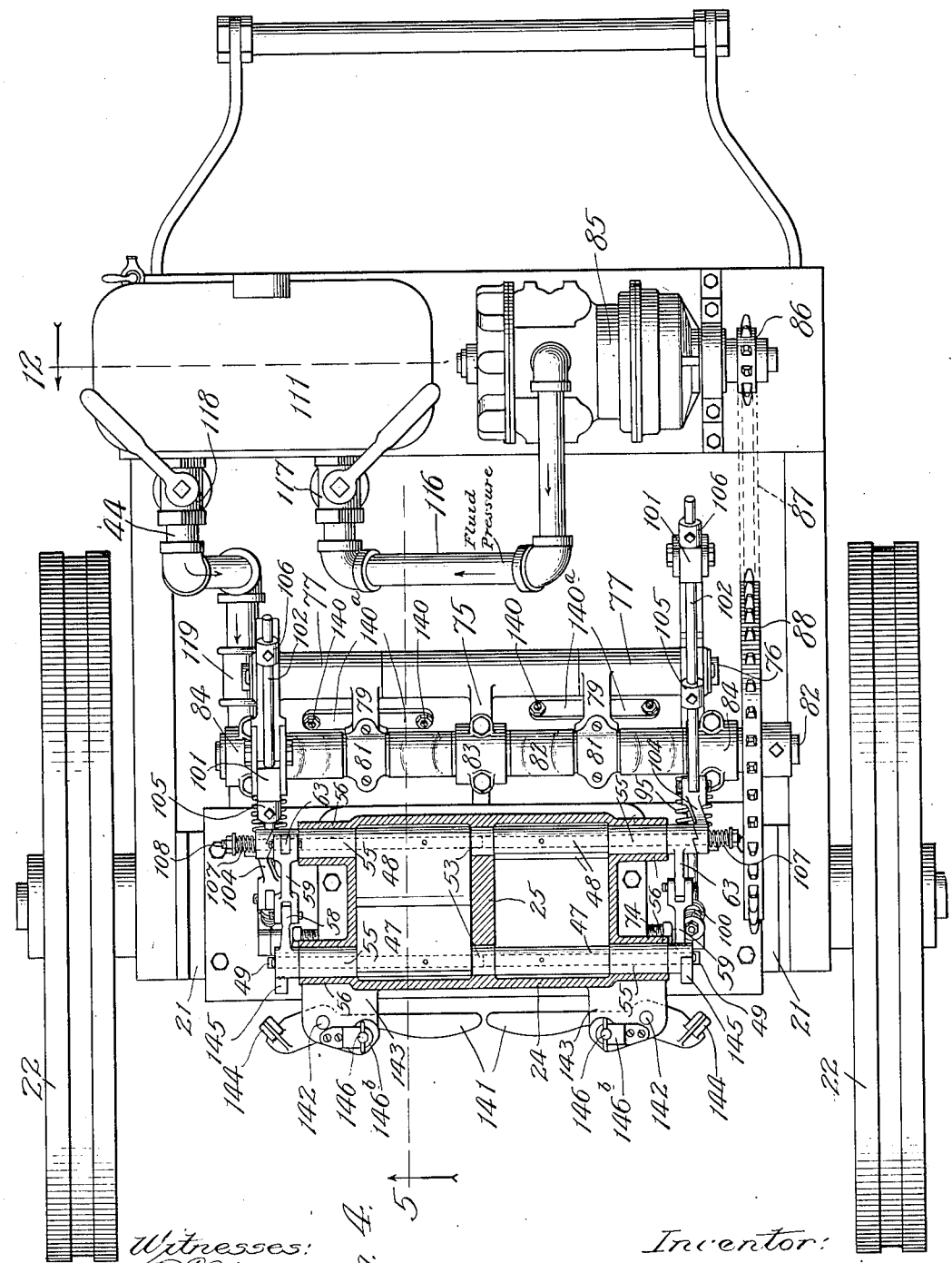

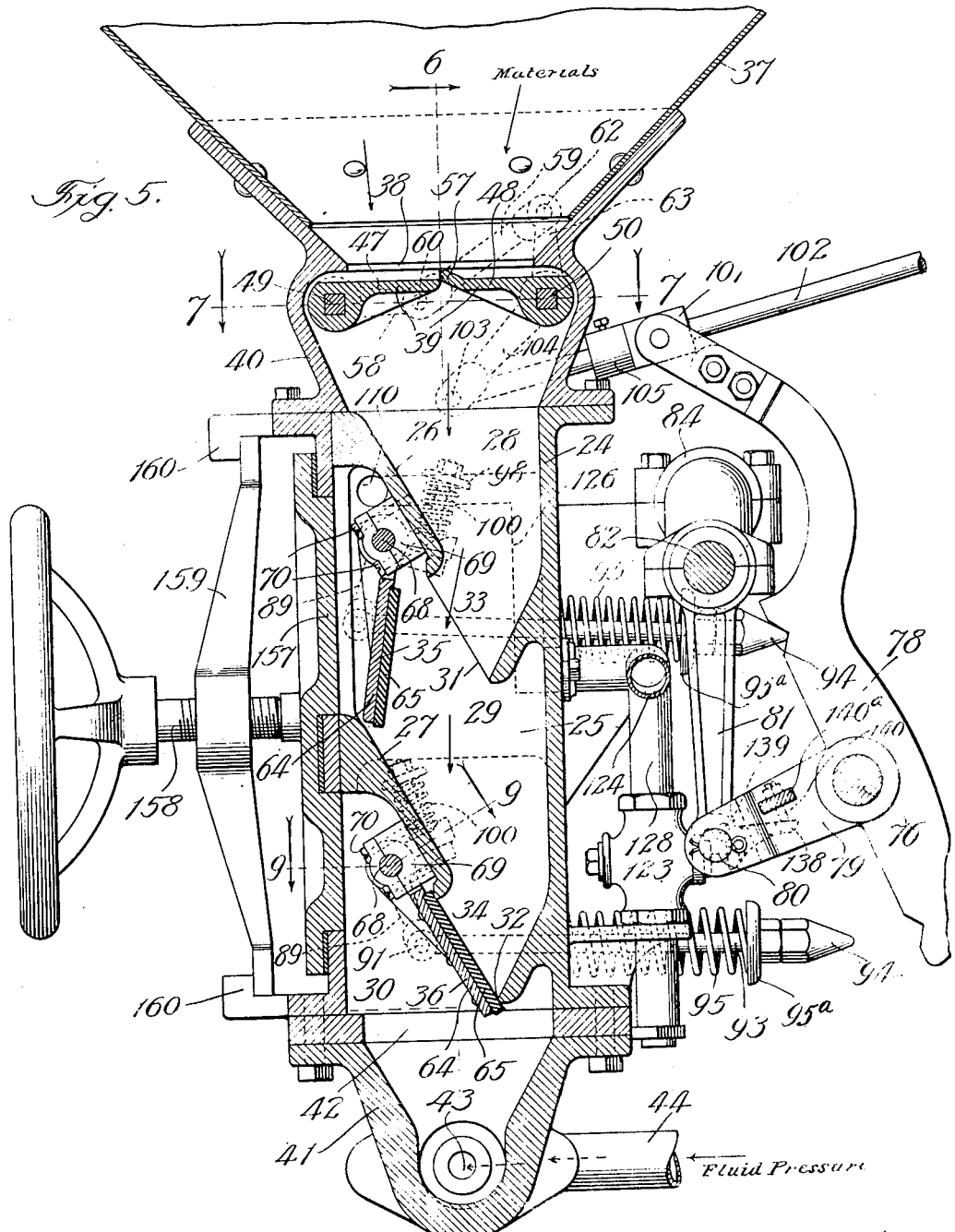

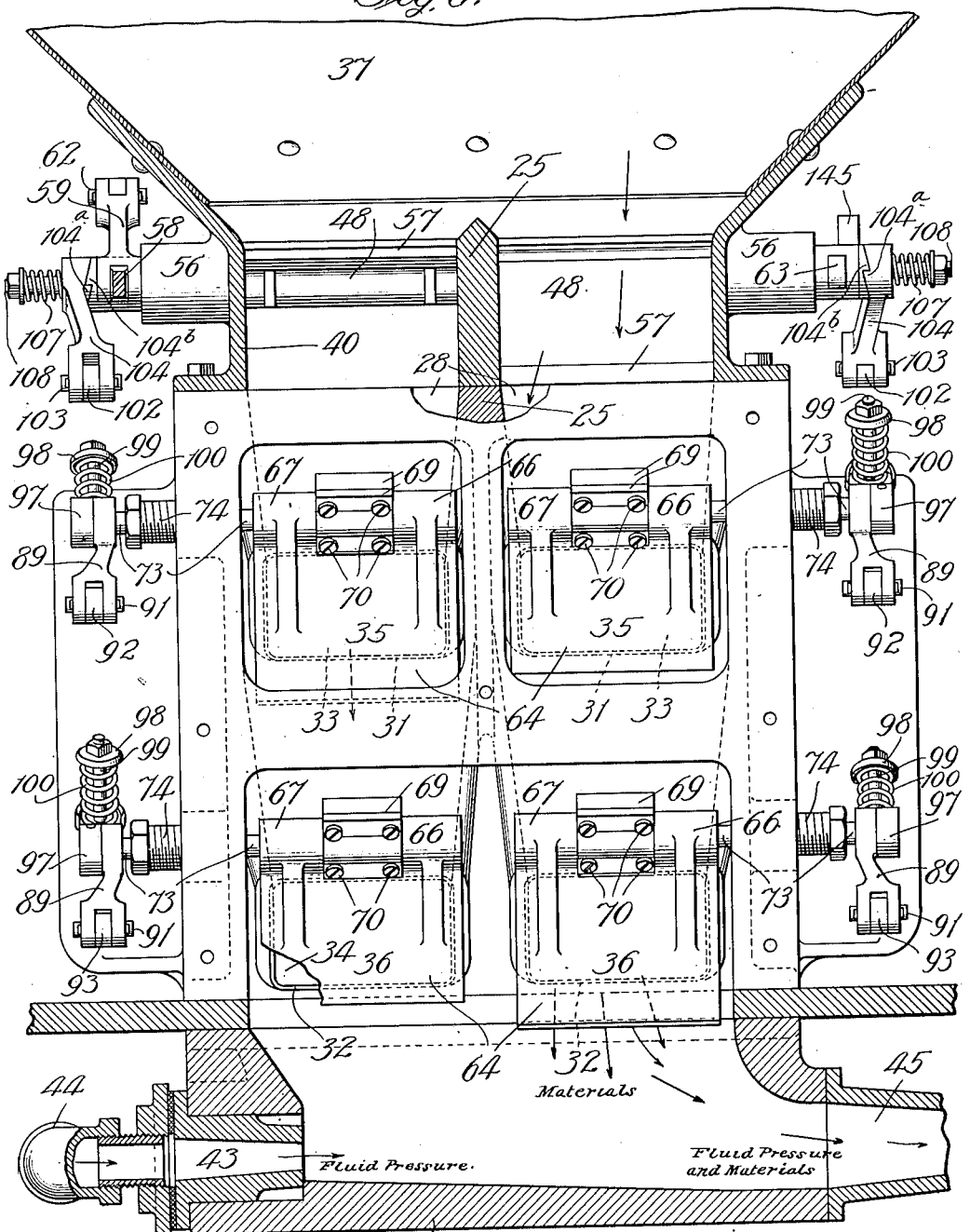

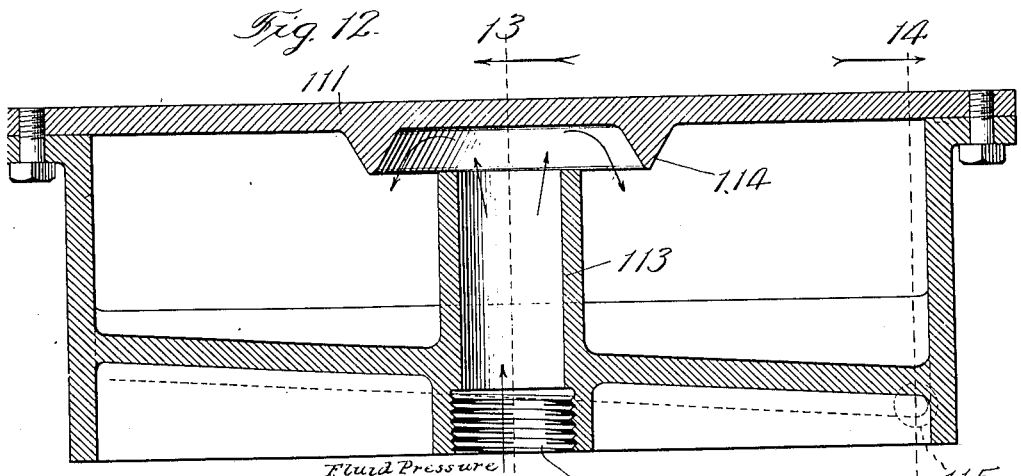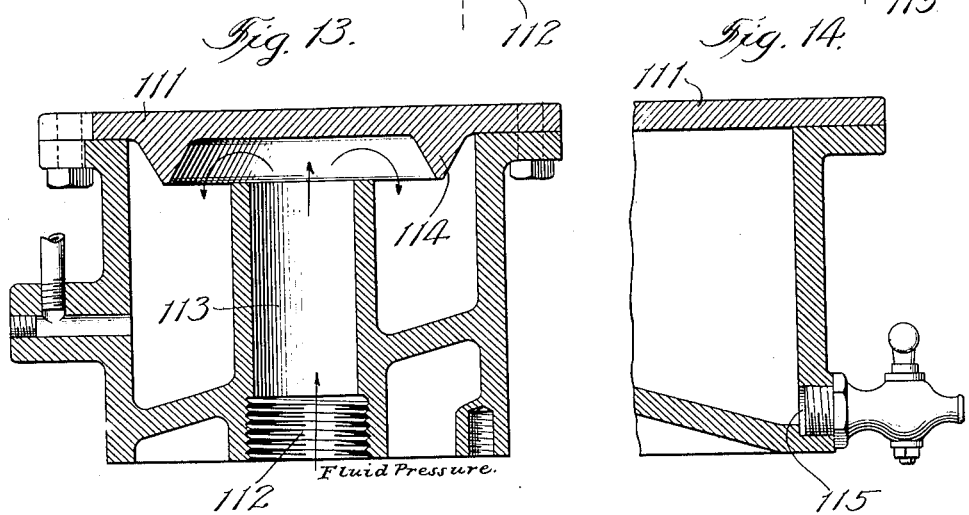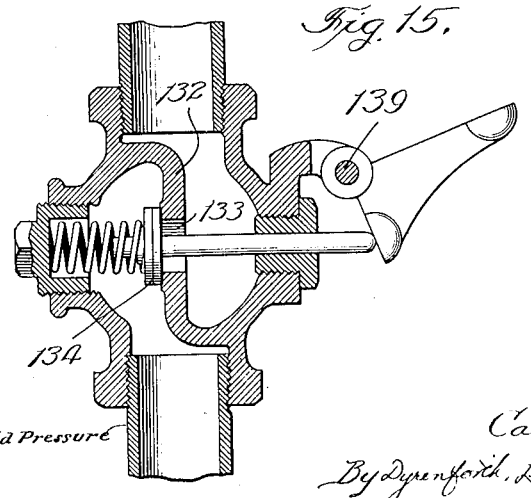

C. WEBER.
APPARATUS FOR PLASTERING WALL SURFACES.
APPLICATION FILED AUG. 7, 1915.
1,298,426.
Patented Mar. 25, 1919.
10 SHEETS—SHEET 9.
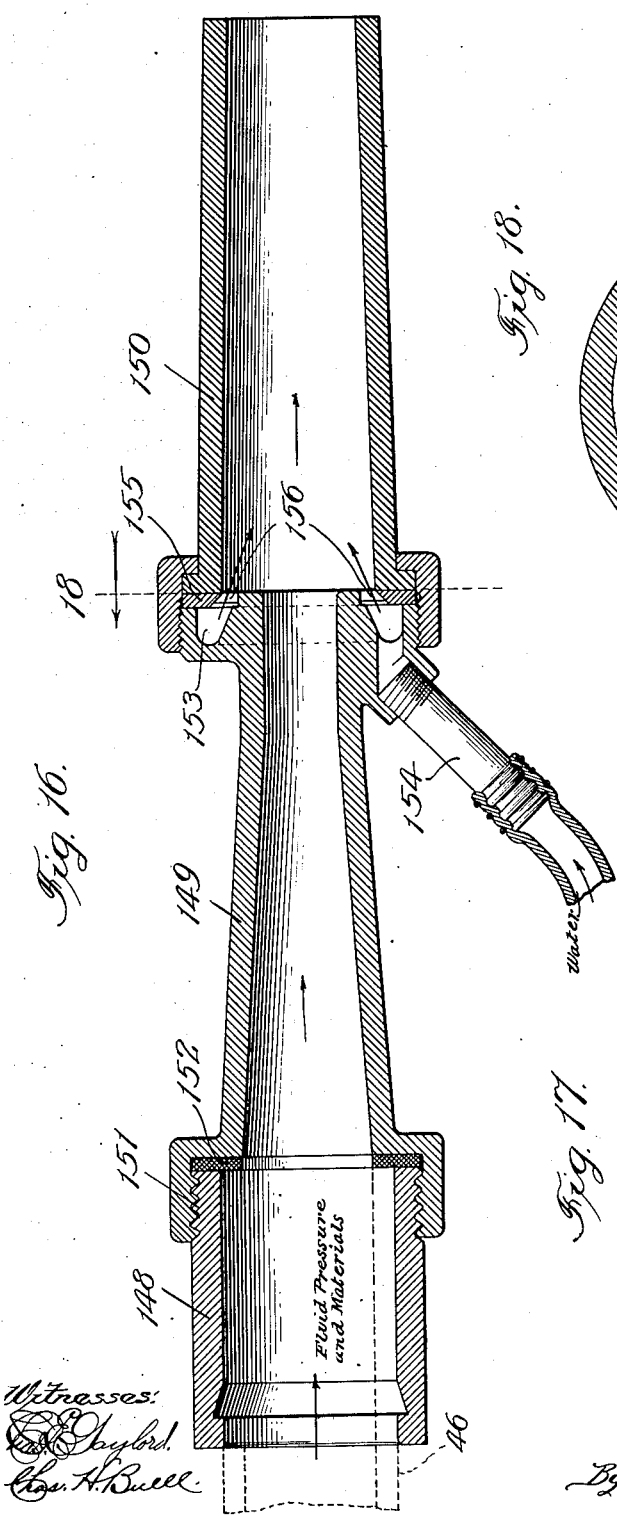
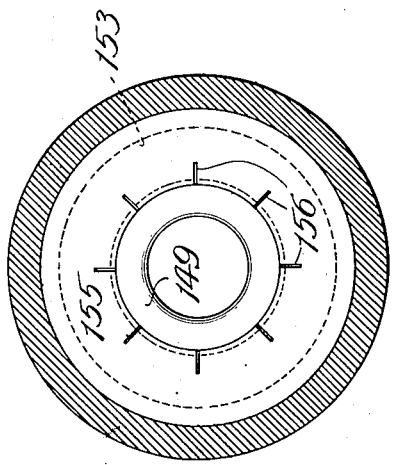
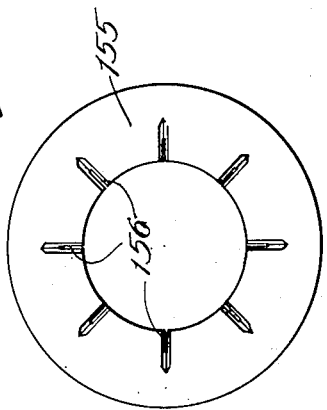
Inventor:
Carl Weber, C. WEBER.
APPARATUS FOR PLASTERING WALL SURFACES.
APPLICATION FILED AUG. 7, 1915.
1,298,426.
Patented Mar. 25, 1919.
10 SHEETS—SHEET 10.
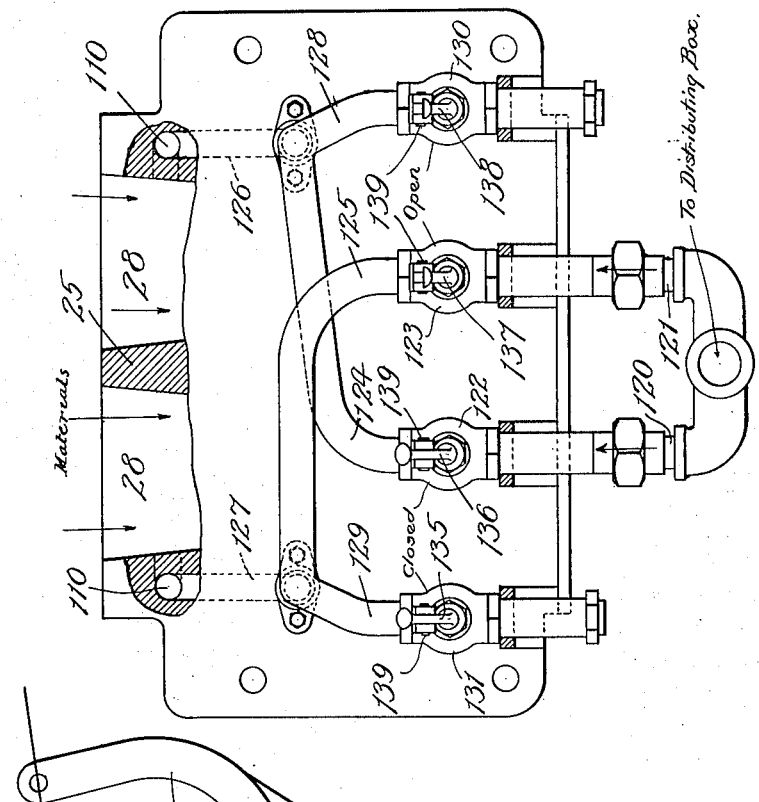
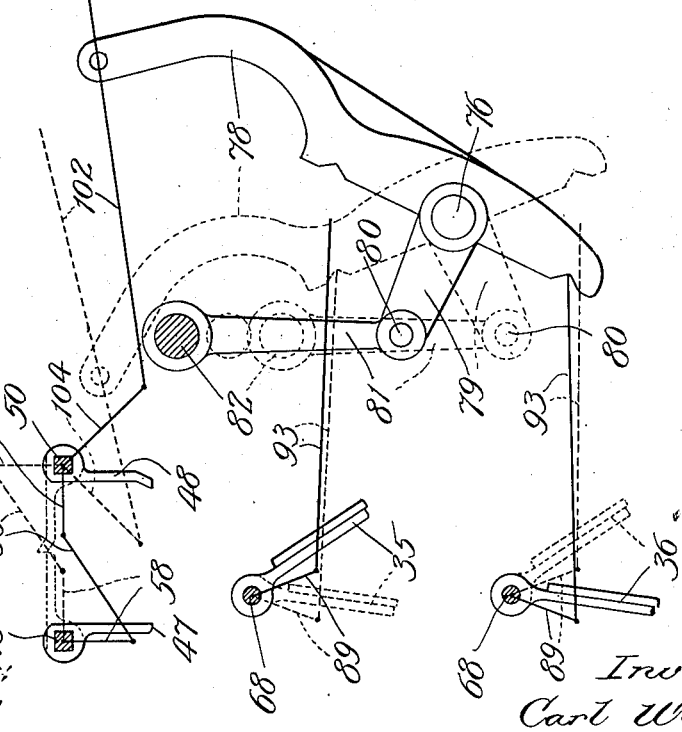
Inventor:
Carl Weber,

UNITED STATES PATENT OFFICE.

CARL WEBER, OF CHICAGO, ILLINOIS, ASSIGNOR TO CEMENT GUN COMPANY, INCORPORATED, OF ALLENTOWN, PENNSYLVANIA, A CORPORATION OF NEW YORK.

APPARATUS FOR PLASTERING WALL-SURFACES.

1,298,426.   Specification of Letters Patent.   Patented Mar. 25, 1919.

Application filed August 7, 1915.   Serial No. 44,273.

*To all whom it may concern:*

Be it known that I, CARL WEBER, a citizen of the United States, residing at Chicago, in the county of Cook and State of Illinois, have invented a new and useful Improvement in Apparatus for Plastering Wall-Surfaces, of which the following is a specification.

My object, generally stated, is to provide improvements in apparatus of the above-referred to character as hitherto provided, to the end that they will be better adapted to perform the service for which they are provided. Certain of my specific objects are to provide a construction of apparatus which may be operated continuously to provide the continuous discharge therefrom of a stream of the plaster, or the like; which will not require interruption of the operation of the apparatus to supply thereto the materials with which to produce the plaster, or the like, to be discharged from the apparatus; and which will utilize to the maximum degree the fluid-pressure employed for blowing the material from the apparatus; to provide a construction of apparatus wherein the valves for controlling the passage of material to the blow-chamber shall be positively and accurately operated in timed relation to insure the proper movement, through the apparatus, of the plaster-ingredients and the conserving of the fluid-pressure employed; to provide for the discontinuation of the feed of the materials without affecting the operation of the other parts of the apparatus whereby, without stopping the apparatus, the feed of materials thereto may be discontinued, and the discharge of the materials continued until the material previously fed has been exhausted, thus causing the apparatus to be self-cleaning; and to provide the valve mechanisms which control the successive movements of the materials through the apparatus, of such form that without impairing them for positive operation, they will yield when unyielding material passing through the apparatus, lodges between the valves and their seats.

I have devised my improved apparatus for use, more particularly, in practising the method of applying plaster-cement, or the like, to wall-surfaces disclosed in, and forming the subject of, U. S. Letters Patent No. 1,139,091, granted to me on May 11, 1915, wherein, before the solid ingredients to form the plaster, or the like, are blown into the hose-line, water to an amount insufficient to effect complete hydration, is mixed therewith, and after subjection to the pressure for blowing it through the hose-line, more water, sufficient in amount to effect complete hydration of the solid materials, is added, and have chosen to illustrate my invention in an apparatus suitable for practising said method, though, as to certain features of my invention, it may be utilized in apparatus other than that suitable for practising the said patented method.

Referring to the accompanying drawings:—

Figure 1 is a view in end elevation of an apparatus constructed in accordance with my invention, one of the sprockets of the driving mechanism and its driving-chain being shown in dotted lines, the better to disclose the details of parts located behind them. Fig. 2 is a view of the rear end of the machine. Fig. 3 is a front view of the machine with certain parts shown in section. Fig. 4 is a plan section taken at the line 4 on Fig. 1 and viewed in the direction of the arrow. Fig. 5 is an enlarged view, in vertical sectional elevation, taken at the line 5 on Fig. 4 and viewed in the direction of the arrow. Fig. 6 is a section taken at the line 6 on Fig. 5 and viewed in the direction of the arrow. Fig. 7 is a section taken at the line 7 on Fig. 5 and viewed in the direction of the arrow. Fig. 8 is a section taken at the line 8 on Fig. 7 and viewed in the direction of the arrow. Fig. 9 is a broken, sectional, view of a detail of valve mechanism employed, the section being taken at the line 9 on Fig. 5 and enlarged, and viewed in the direction of the arrow. Fig. 10 is a perspective view of the valve and bearing pin coöperating therewith, of the structure shown in Fig. 9, these parts being shown disassembled. Fig. 11 is a perspective view of certain details of the mechanism for operating the valve of Fig. 9. Fig. 12 is an enlarged sectional view of the air-distributing box, the section being taken at the line 12 on Fig. 4 and viewed in the direction of the arrow. Fig. 13 is a section taken at the line 13 on Fig. 12 and viewed in the direction of the arrow. Fig. 14 is a section taken at the line 14 on Fig. 12 and viewed in the direction of the arrow. Fig. 15 is a sectional view of one of the plurality of similar air-valves employed. Fig. 16 is a longitudinal, sectional, view of the nozzle of the hose-line. Fig. 17 is a view of the inner face of a disk forming a portion of the nozzle and through which water enters the interior of the latter. Fig. 18 is a section taken at the line 18 on Fig. 16 and viewed in the direction of the arrow. Fig. 19 is a view, in the nature of a diagram, illustrating by full and dotted lines, the relative positions of the valves and operating mechanism therefor, in two different positions thereof; and Fig. 20, a view in elevation of the casing containing the chambers through which the material passes to the blow-off line, and the air-pipe connections with these chambers, certain portions of the structure illustrated being shown in section.

The frame of the apparatus which is in the form of a yoke, is represented at 21 and is supported on wheels 22 by means of which the apparatus is adapted to be readily moved about from place to place as desired. Rigidly secured to the horizontal cross-piece of the frame 21 is a casing 24 containing, in the particular construction illustrated, a centrally-disposed vertical partition 25. The casing at opposite sides of the partition 25 is provided with two vertical series of three chambers each, these chambers being represented at 28, 29 and 30 and separated by partitions 26 and 27. The partitions 26 and 27 are preferably formed, as shown, to present seats 31 and 32, respectively, disposed horizontally in a plane inclined relative to the vertical plane and surrounding relatively large openings 33 and 34, respectively, in these partitions. Coöperating with the partitions 26 and 27 and forming removable closures for the lower ends of the chambers 28 and 29, are valves 35 and 36, respectively, supported, in a manner hereinafter described, to be rocked into, and out of, engagement with the seats 31 and 32. Surmounting the casing 24 is a hopper 37 for the solid particles for forming the plaster to be discharged from the apparatus, the hopper 37 communicating with the upper ends of the chambers 28 through openings 38, in its bottom, controlled by valves 39 hereinafter described, the casing 24 in the particular construction illustrated being formed with a separate upper section 40 bolted to the main portion of the casing 24 and in part forming the chambers 28. Secured to the underside of the cross-piece of the frame 24 is a hollow member 41 which is open at its upper end and communicates, through an opening 42 in the frame 24 supporting it, with the lower ends of the chambers 30 of which it, in effect, forms a part. The member 41 is provided at one end with an inlet 43 adapted to be connected with a pipe 44 supplied with suitable fluid-pressure, as hereinafter described, and at its opposite end with an outlet 45 connecting with a hose-line 46.

Each valve 39 is preferably formed of a pair of valve-members 47 and 48 which coöperate with each other to control communication between the lower end of the hopper 37 and the chamber 28 with which these valve-members coöperate. The members 47 and 48 are rigidly secured at their edges to shafts 49 and 50 as by mounting them at their square openings 51 on the square portions 52 of these shafts. The shafts 49 and 50 are located at opposite sides of the chamber 28, one end of each shaft 49 and 50 being journaled in a bearing 53 in the partition 25. At the opposite end of the valve-members the shafts 49 and 50 fit at their square portions 52 into square openings 54 in bushings 55 journaled in bosses 56 projecting from the ends of the casing-section 40. The arrangement is such that the valve-members of each pair swing in a vertical plane and in moving to closed position swing upwardly and toward each other to meet at their free edges as shown in Fig. 5, the valve-members 48 being preferably formed at their free edges opposing the other valve-members 47, with upwardly offset portions, as represented at 57, whereby the free edges of the valve-members 48, when the valves 39 move to closed condition, are in advance of the opposing edges of the valve-members 47 which prevent lumps of material from lodging between the opposing edges of these members. Each pair of shafts 49 and 50 are connected together, for simultaneous movement in opposite directions, by means of crank-arms 58 fixed on the outer ends of the shafts 49, and links 59 pivoted at 60, to the arms 58, and pivoted at 62, to crank-arms 63 rigid on the square portions of the shafts 50, the parts described being so proportioned and arranged that when the shafts 50 are rotated, as hereinafter described, the valve-members 47 and 48 will be swung toward or away from each other to close or open the chambers 28 to the hopper 37 depending on the direction in which said shafts are rotated.

The valves 35 and 36 are each formed of a plate 64 provided with a facing 65 of rubber, where these valves close against the respective seats 31 and 32, and each have spaced lugs 66 and 67 at their upper edges in which a shaft 68 is fixed, (Figs. 9 and 10) the valves 35 and 36 being journaled at the portions of the shafts 68 between the lugs 66 and 67, on bosses 69 secured to the undersides of the upper portions of the respective partitions 26 and 27, these bosses being preferably formed of separate sections bolted together, as indicated at 70. Each lug 66 is provided with a recess 71 in one end into which a laterally-extending lug 72 on a shaft 73 extends, the shafts 73 being journaled in a side of the casing 24 and extending beyond the latter through stuffing-boxes 74 where they are connected with the valve-operating mechanism, a description of which is as follows:

Secured in a web 75 projecting from the casing 24 (see Figs. 3 and 4) is a horizontally disposed shaft 76 having journaled thereon, at its opposite ends, sleeves 77 with levers 78 rigidly secured thereto between the ends of the latter, these sleeves having rearwardly projecting crank-arms 79 secured thereto, which are pivotally connected at 80 with the lower ends of links 81 journaled at their upper ends on the oppositely disposed crank-portions of a crank-shaft 82 journaled in bearings 83 on the web 75 and on extensions 84 on the casing 24, respectively, the shaft 82 being driven in any suitable manner, as by an air-motor supported on the frame 24 and represented at 85 and carrying a sprocket 86 driven by the motor and connected by a sprocket-chain 87 with a sprocket 88 fixed on the shaft 82, it being readily understood that when the shaft 82 is rotated it will oscillate the levers 78. One of the levers 78 is provided for actuating the valves 35, 36 and 39 of one set, and the other lever 78 for actuating the corresponding valves of the other set thereof. To this end, in the preferred construction illustrated, each shaft 73 has journaled on it a bell-crank 89 pivoted at its depending arm 90, as indicated at 91, to a horizontally-disposed longitudinally-reciprocable rod, these rods being indicated at 92 and 93, respectively, and arranged in planes above and below the shaft 76, the outer ends of the rods 92 and 93, at which they are adapted to be engaged by the levers 78 for actuating them in one direction, being tapered as represented at 94, with coiled springs 95 surrounding the rods 92 and 93 and confined between extensions 96 of the casing 24, and through which these rods extend, and washers 95ª on said rods. The outer ends of the shafts 73 have rigidly secured thereto, levers 97 between which and washers 98, secured on pins 99 carried by arms of the bell-cranks 89 and extending upwardly through the levers 97, coiled springs 100 are confined. The levers 78 carry blocks 101 at their upper ends which slide on rods 102 pivotally connected at their rear ends, as indicated at 103, to crank-arms 104 on the respective shafts 50, the rods 102 being provided with stops 105 and 106 spaced apart and adapted to be alternately engaged by the blocks 101 in the movements of the latter in opposite directions. The crank-arms 104 are journaled on the extremities of the shafts 50 and the faces thereof which oppose the crank-arms 63 are formed with ratchet-teeth 104ª which oppose similar, but oppositely-disposed, ratchet-teeth 104ᵇ on the crank-arms 63, coiled springs 107 surrounding pins 108 on the shafts 50 and confined between washers 109 thereon and the outer faces of the crank-arms 59, serving to yieldingly maintain the ratchet-faces 104ª and 104ᵇ in engagement. The ratchets 104ª and 104ᵇ are so disposed that their teeth will interlock in the movement of the crank-arms 63 for swinging the valve-members 47 and 48 to closed condition, and the springs 107 are so tensioned that the members 47 and 48 will swing to open condition on the return movement of the crank-arms 63.

In the operation of the machine air, or other suitable fluid-pressure, is continuously supplied to the chambers 30 through the inlet 43 and intermittently to the chambers 29 through inlets 110 therein (see Figs. 5 and 20), the mechanism whereby the fluid-pressure is thus supplied, and also directed to the motor 85, comprising the following described elements:

Mounted on the frame of the machine is a fluid-pressure distributing box 111 (see Figs. 4, 12, 13 and 14) containing a centrally-disposed inlet 112 on its underside which is adapted to be connected with any suitable source of fluid-pressure and opens into a vertically-disposed pipe 113 which extends upwardly to within a slight distance of the underside of the top of the box provided with an annular depending flange 114 concentric with the pipe 113. The bottom of the box 111 is inclined to the horizontal to train to a valve-equipped outlet 115, water which may accumulate in the box. A pipe 116 provided with a hand-controlled valve 117 leads from the interior of the box 111 to the inlet-end of the motor 85, the interior of this box being connected with the pipe 44 which is controlled by a hand-valve 118 and connects at 119 intermediate its ends with branch-pipes 120 and 121 (see Figs. 3 and 20) opening into valve-casings 122 and 123, respectively, the outlets of which connect with pipes 124 and 125, respectively, which communicate with passages 126 and 127 in the wall of the casing 24 and terminate in the inlets 110 of the chambers 29, the pipes 124 and 125 communicating with exhaust pipes 128 and 129, respectively, and opening into valve-casings 130 and 131. The valve-casings 122, 123, 130 and 131 contain diaphragms 132 (see Fig. 15) having openings 133 controlled by spring-seated valves 134, the outer ends of which project into the path of movement of rocker-arms 135, 136, 137 and 138, respectively, pivoted on the respective valve-casings as indicated at 139. The rocker-arms 135, 136, 137 and 138 extend normally, under the action of the springs of the valves 134, into the path of movement of pins 140 provided on bars 140ª connected with, and extending laterally from, the arms 79, the rockers 135 and 136 being simultaneously operated in the same direction by the pins 140 on the bars 140ª on one of the arms 79, and the rockers 137 and 138 being similarly operated by the pins 140 on the other of the arms 79.

The operating mechanisms for the valves 34, 35 and 39 are so constructed and arranged that the valves 34 and 35 open alternately, but neither is in open condition when the other is open, both of these valves remaining closed momentarily at the same time, and the valves 35 and 39 open also alternately, neither being open when the other is open. The fluid-pressure controlling mechanism described, is so constructed and arranged that fluid-pressure is admitted to the chambers 29 only when the valves 36 are open, and the fluid-pressure in these chambers, when the valves 36 are closed, may exhaust therefrom.

The operation of the apparatus is as follows: Assuming the driving mechanism described to be in operation, which operates the various valves 34, 35 and 39 as described, the materials to be discharged from the apparatus which, in the use of the apparatus for applying cement plaster in accordance with the said patented method, would be sand and cement mixed in the proper proportions with sufficient water to moisten them and produce incomplete hydration only, and with which the hopper would be charged, upon the opening of the valves 39 drops into the chambers 28 against the valves 35 therein, which are then in closed condition. The levers 78 in rocking in an anti-clockwise direction, Fig. 5, close the valves 39 by engaging the blocks 105 and force open the valves 35 against the action of their springs 95, the charges in the chambers 28 thereupon dropping into the chambers 29 and against the valves 36 which are closed. The levers 78 then rock in the opposite direction, which permits the valves 35 to close and thereupon force open the valves 36 which permits the charges in the chambers 29 to drop into the blow-chamber 30, from which they are blown through the hose-line at the discharge nozzle in which more water, in practising the said patented method above referred to, is added to the materials in an amount sufficient to produce complete hydration of the mixture, as hereinafter described, fluid-pressure under the same pressure as that supplied to the chamber 30 flowing into the chambers 29 when the valves 36 are opened, to balance the pressure in these chambers. The levers 78 in operating as just described and upon nearing the limit of their movement, engage the blocks 106 and force the valves 39 to open condition, the latter opening the hopper 37 to the chambers 28 which receive material from the hopper. In the following initial movement of the levers 78 in an anti-clockwise direction, the valves 36 are permitted to close under the action of their springs 95, the supply of fluid-pressure to the chambers 29 is shut off and these chambers opened to the atmosphere through the operation of the valves 135 and 138. Further movement of the levers 78 in this direction opens the valves 35, the valves 39 closing in this movement, whereupon the charges previously introduced into the chambers 28 drop into the respective chambers 29 below them. Thus charges of material are intermittently fed to the blow-chamber to maintain it constantly supplied with the mixture to be discharged through the hose-line.

It will be understood from the foregoing description that the levers 78 are oppositely operated and thus material is fed into a position to be operated on by the fluid-pressure in the blow-chamber 30, first from one of the chambers 29 and then from the other, the valve-controlled chambers through which the material passes, as described, being provided in two sets to form two units. Where desired, a single one only of these units may be employed, or more than two, in which latter case the levers 78 would preferably be provided of a number corresponding with the number of said units, and the mechanisms operated thereby and the valve-mechanisms controlling the introduction of fluid-pressure into the chambers 29 and exhaust therefrom, likewise provided of a corresponding number.

It will be observed that the chambers 29 are in effect fluid-pressure locks which are provided for preventing the fluid-pressure used to blow the materials from the hose-line, from discharging into the hopper 37, which latter thereby need not be air tight and the machine permits of constant operation without interruption in charging the hopper.

In the use of an apparatus of this character it is desirable that means be provided whereby, without interrupting the operation of the apparatus to discharge therefrom the material introduced into the chambers 28, continued passage of material to the chambers 28, may be arrested, this being desirable, as for example, where the operation of plastering a wall, or the like, nears completion, and furthermore where it is desired to clear the apparatus of the materials therein. In the preferred construction illustrated provision is made for thus operating the apparatus by the following described construction:

As hereinbefore explained, the valve-members 47 and 48 are shifted to open condition in the movement of the ratchet teeth 104ᵇ away from the teeth 104ª, and not by a positive mechanical interlock, and to prevent moving these valve-members to open position, I provide levers 141 pivoted at 142 on bifurcated extensions 143 of the casing 24 and adapted to be swung into and out of a position in which their end-portions 144 interlock with lugs 145 on the crank-arms 58 when the valves 47 and 48 are closed. The levers 141 are releasably held in position wherein they do not interfere with the operation of the valves 39, by pins 146 reciprocably mounted in the upper sections of the extensions 143 and normally interposed in the path of the levers 141 under the action of springs 146ᵃ confined between heads on these pins and brackets 146ᵇ on the extensions 143. When the levers 141 are positioned as just stated, the crank-arms 104 in swinging in a direction for opening the valves 39 will rock idly on the shafts 52. If desired, where more than one of the units above referred to are employed operating alternately as stated, this feature of holding the valves 39 in the closed position may be availed of in the initial charging of the hopper 37, with material.

The form of nozzle which I prefer to employ at the discharge-end of the hose-line and at which the said added quantity of water for effecting complete hydration, when the apparatus is used for practising the said patented process, is introduced into the material, is that illustrated, this nozzle, referring particularly to Figs. 16, 17 and 18, being formed of three sections 148, 149 and 150. The section 148 is secured to the outer end of the hose-line 46 in any desirable manner and is provided externally with screw-threads 151 at which it screws into the adjacent end of the section 149, a washer 152 being confined between the abutting ends of these two sections. The outer end of the section 149 contains a continuous groove 153 which opens into a pipe 154 leading to any suitable source of water-supply. The section 149 screws into the adjacent end of the section 150, a disk 155 being confined between the abutting ends of the sections 149 and 150 and containing a series of radially-disposed slits 156, which communicate with the groove 153. The passage through the section 149 gradually tapers toward its outer end, as shown in Fig. 16, the passage through the section 150 being of considerably larger diameter than the outlet-end of the passage in the section 149, with which it communicates, and communicating with the slits 156. Under the pressure discharged into the nozzle from the blow-chamber 30, suction is produced at the slits 156 which operates to draw water through the pipe 154 into the nozzle for thorough mixture in the nozzle-section 150, with the materials discharged through the hose-line by the fluid-pressure in the blow-chamber 30, whereby complete hydration is effected. The suction referred to is enhanced by tapering the passage in the nozzle, as stated.

It will be observed from the foregoing that should any lumps of material, or anything which will not yield, become interposed between any of the valves 35 and 36 and its coöperating seat, damage to the apparatus will not result as these valves close under the action of the springs 95, which under such conditions would yield; and furthermore, should any of the valves 34 or 35 be prevented from opening to the full extent, the spring connections between these valves and the cranks 90 will yield, thereby avoiding impairment of these parts of the apparatus.

It is preferred that the valves 34 and 35 be readily removable from the casing 24, and to this end the rear side of the casing, represented at 157, is separate from the other sides of the casing and is adapted to be held in place through the medium of a screw 158 bearing at its inner end against the casing 157 and having threaded connection with the member 159 which interlocks at its opposite ends with lugs 160 provided on the casing 24. Upon removing the section 157 and unscrewing the stuffing-boxes 74, the shafts 73 may be readily disconnected from the bosses 66 and the valves 35 and 36 thereupon are readily removable by removing the screws 70.

While I have illustrated and described a particular embodiment of my invention, I do not wish to be understood as intending to limit it thereto as the same may be variously modified and altered without departing from the spirit of my invention.

What I claim as new and desire to secure by Letters Patent is—

1. In apparatus of the character set forth, the combination of a series of chambers one of which is a blow-chamber, valves controlling communication between said chambers, means operating said valves to cause material introduced into the first of the series of said chambers, to successively pass through said chambers and into said blow-chamber, and releasable means adapted to be moved into and out of engagement with one of said valves remote from said blow-chamber, and operating when in one position to hold said valve closed, the connection between said first-named means and said last-referred-to valve being constructed and arranged to permit said valve-operating means to operate idly relative to said last-referred-to valve when said last-named means are in position for holding this valve closed, and operate the others of said valves to effect the passage through said chambers of the material previously introduced into these chambers.

2. The combination of a chamber for receiving material provided with an outlet, valve-mechanism formed of a valve proper mounted to be moved into and out of a position for closing said outlet, said valve mechanism being formed of sections with a spring connection between said sections operating to permit the valve-proper to have yielding movement relative to one of said sections when undue pressure is exerted against said valve proper in its movement toward closed position, and means for operatively engaging said last-referred-to section for actuating said valve-mechanism in opposition to said spring.

3. The combination of a chamber for receiving material and provided with an outlet, valve mechanism formed of a valve proper mounted to be moved into and out of a position for closing said outlet, said valve mechanism being formed of a pivotally-supported section carrying the valve proper, a second pivotally-supported section, and a spring device connecting said sections together and yieldable in the direction of closing the valve, and means for operatively engaging said last-referred to section for actuating said valve proper through the medium of said spring.

CARL WEBER.

Witnesses:
A. C. FISCHER,
L. V. HIGGINS.